United States Patent [19]
Fujikawa et al.

[11] Patent Number: 5,626,425
[45] Date of Patent: May 6, 1997

[54] ELECTRONIC THERMOMETER WITH AUDIBLE TEMPERATURE RISE INDICATOR

[75] Inventors: Toyoharu Fujikawa, Saitama, Japan; Tim H. Gordon, Rivervale; Louis A. Marcelina, Ridgewood, both of N.J.

[73] Assignees: Becton Dickinson and Company, Franklin Lakes, N.J.; Citizen Watch Company Limited, Tokyo, Japan

[21] Appl. No.: 384,122

[22] Filed: Feb. 6, 1995

[51] Int. Cl.$^6$ .................................... G01K 7/00
[52] U.S. Cl. .................. 374/163; 128/736; 340/692
[58] Field of Search ................. 128/736; 340/584, 340/589, 692; 364/557; 374/163, 170, 171, 172, 186

[56] References Cited

U.S. PATENT DOCUMENTS

| | | | |
|---|---|---|---|
| 3,817,105 | 6/1974 | Luhowy | 374/163 |
| 3,877,307 | 4/1975 | Georgi . | |
| 4,121,462 | 10/1978 | Mohrman | 73/362 |
| 4,399,824 | 8/1983 | Davidson | 128/736 |
| 4,447,884 | 5/1984 | Wada | 364/557 |
| 4,551,031 | 11/1985 | Ishikawa et al. | 128/736 |
| 4,728,199 | 3/1988 | Murai et al. | 374/170 |
| 4,751,576 | 6/1988 | Mehrgardt . | |
| 4,762,429 | 8/1988 | Fujikawa | 374/163 |
| 4,811,198 | 3/1989 | Ota et al. | 374/169 |
| 4,844,623 | 7/1989 | Wada | 374/171 |
| 5,013,161 | 5/1991 | Zaragoza et al. | 374/208 |

FOREIGN PATENT DOCUMENTS

| | | |
|---|---|---|
| 0561348 | 9/1993 | European Pat. Off. . |
| 55-116234 | 9/1980 | Japan . |
| 59-6737 | 1/1984 | Japan . |
| 60-151527 | 8/1985 | Japan . |
| 61-003019 | 1/1986 | Japan . |
| 63-196114 | 8/1988 | Japan . |
| 2133562 | 7/1984 | United Kingdom . |

*Primary Examiner*—G. Bradley Bennett
*Attorney, Agent, or Firm*—Akin, Gump, Strauss, Hauer & Feld, L.L.P.

[57] ABSTRACT

An electronic thermometer for measuring body temperature has a temperature sensor for detecting a sensed temperature and for producing an output indicative of the sensed temperature and a temperature rise detector for detecting whether the sensed temperature is rising. If the sensed temperature is rising, the temperature rise detector produces a temperature rise signal. The thermometer is provided with circuitry for generating an audible signal in response to the temperature rise signal. The device thus audibly indicates that the sensed temperature is rising and that the temperature measurement is proceeding normally. The temperature sensor includes a thermosensitive oscillator, the oscillating frequency of which changes depending on a change in its temperature, and a reference oscillator for generating a reference signal. A temperature counter counts an output signal from the thermosensitive oscillator on the basis of the reference signal. A data hold unit holds a maximum value of data on the measured signals in the temperature counter. A comparator compares data in the data hold unit and the new data in the temperature counter to thereby rewrite the data in the data hold unit with the new measured data in accordance with the result of the comparison by the comparator. The temperature rise detector detects whether the measured temperature is rising in accordance with the result of the comparison by the comparator. A temperature rise detection signal from the temperature rise detection device drives a sound generator to inform that the measured temperature is rising.

7 Claims, 6 Drawing Sheets

ELECTRONIC THERMOMETER WITH AUDIBLE TEMPERATURE RISE INDICATOR

BACKGROUND OF THE INVENTION

The present invention relates to electronic thermometers and more particularly to an electronic thermometer improved so as to inform the user that the thermometer is normally measuring a patient's body temperature.

Electronic thermometers have, in recent years largely replaced mercury thermometers. Electronic and mercury thermometers are typically in the form of pencil-like objects. In the case of an electronic thermometer, the measured temperature is displayed on an integral digital read out.

Since the user cannot readily observe the temperature display of an electronic pencil-type thermometer placed in the mouth (under the tongue), in the rectum or under the arm during measurement, the thermometer must be removed at a predetermined time after the measurement started to confirm the temperature display. If the sensor of the thermometer is not held in position properly, the measurement could fail and have to be repeated. Thus, with the conventional electronic thermometer, the user cannot know whether his or her body temperature has risen during the measurement or whether his or her body temperature is being measured correctly (for example, whether the sensor of the thermometer is held in the correct position).

It is therefore an object of the present invention to provide an electronic thermometer which informs the user of the presence or absence of an increase in his or her body temperature during the measurement or whether the thermometer is being used appropriately during the measurement.

SUMMARY OF THE INVENTION

The present invention is an electronic thermometer for measuring body temperature. The thermometer has a temperature sensor for detecting a sensed temperature and for producing an output indicative of the sensed temperature. A temperature rise detection circuit detects whether the sensed temperature is rising. If the sensed temperature is rising, the temperature rise detection circuit produces a temperature rise signal. The device provided with circuitry for generating an audible signal in response to the temperature rise signal. The device thus audibly indicates to the user that the sensed temperature is rising and that the temperature measurement is proceeding normally.

The invention also includes a method of measuring body temperature and of monitoring temperature measurement. The method comprises the steps of sensing a temperature by means of an electronic temperature sensor and generating an output indicative of the sensed temperature; analyzing the output to determine whether the sensed temperature is increasing; and generating an audible temperature increase signal if the sensed temperature is increasing, thereby indicating normal operation of the temperature measurement.

DESCRIPTION OF THE PREFERRED EMBODIMENT

Figure 1:
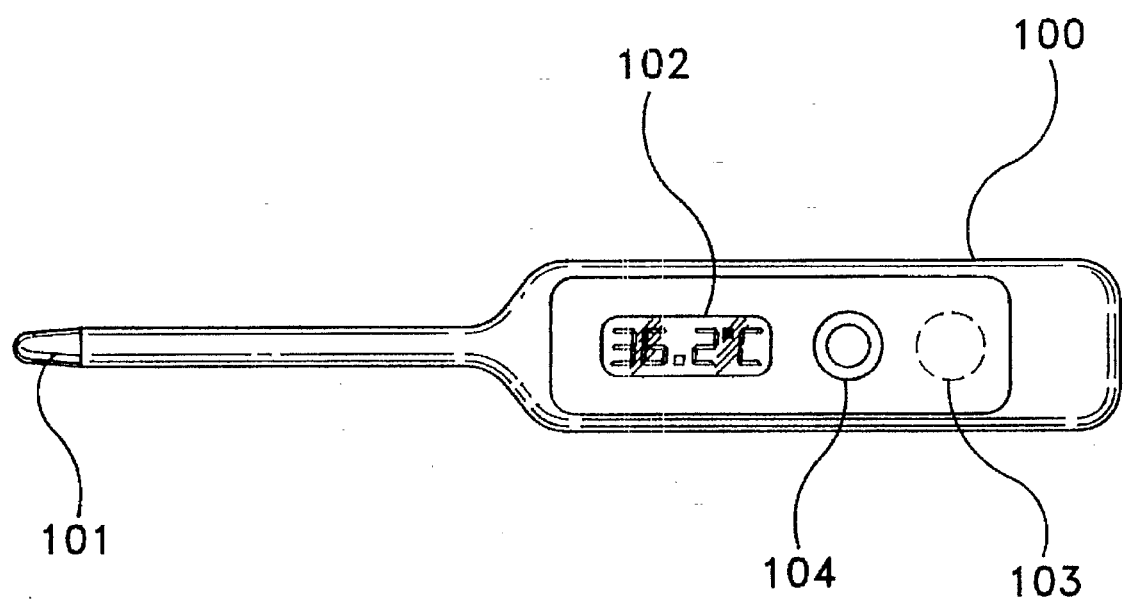
FIG. 1 shows the outward appearance of the electronic thermometer according to the present invention.

Referring to FIG. 1, an electronic thermometer 100 according to the present invention has a thermosensor 101 at the proximal end for sensing the temperature of a body, and in its main body at the distal end, a display 102, a buzzer 103 and a power supply switch 104.

Figure 2:
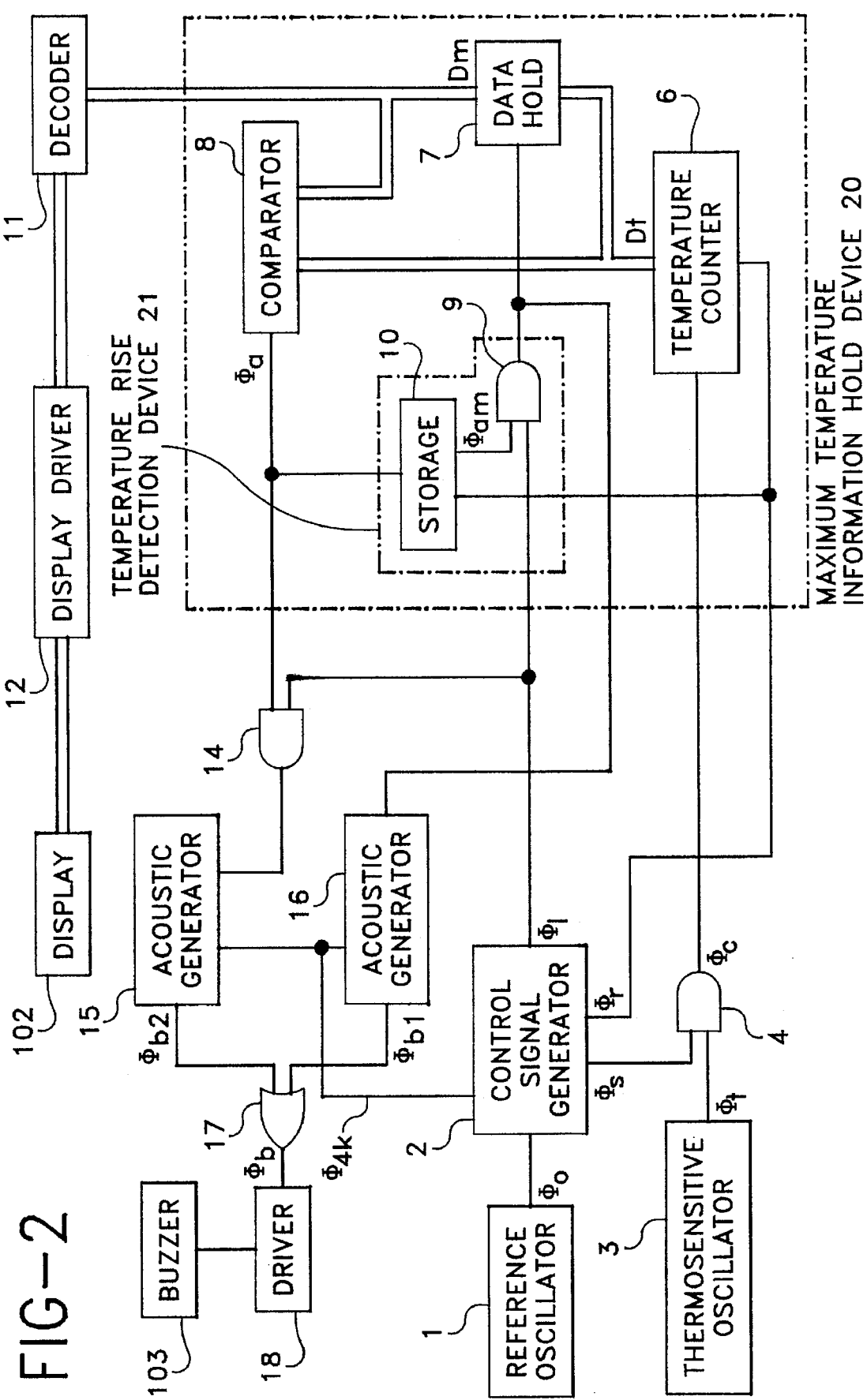
FIG. 2 is a block diagram of an electronic thermometer according to the present invention.

In FIG. 2, reference numeral 1 denotes a reference oscillator which generates a reference signal $\Phi_0$. Numeral 2 denotes a control signal generator which receives the reference signal $\Phi_0$ and outputs a reset signal $\Phi_r$, a sampling signal $\Phi_s$ and a latch signal $\Phi_1$ as illustrated in FIG. 3(B), (C), and (D), respectively. Control signal generator 2 also outputs a carrier signal $\Phi_{4k}$. Numeral 3 denotes a thermosensitive oscillator which generates a thermosensitive signal $\Phi_t$ (See FIG. 3(A)) made up of pulses whose frequency depends on a change in the temperature sensed by the thermosensor 101. The output of thermosensitive oscillator 3 therefore varies with the temperature sensed by thermosensor 101. Sampling AND gate 4 receives at one input sampling signal $\Phi_s$ fed from the control signal generator 2, receives thermosensitve signal $\Phi_t$ at the other input from the thermosensitive oscillator 3, and outputs a temperature count signal $\Phi_c$, having a fixed duration set by sampling signal $\Phi_s$. See FIGS. 3(C), (A), and (E). Temperature counter 6 is a four digit counter, each digit being a decade counter, counting the number of pulses in $\Phi_c$. The counter for each digit is therefore a binary coded decimal circuit. Temperature counter 6 is initialized by a reset signal $\Phi_r$ from the control signal generator 2. Temperature counter 6 counts the pulses produced by thermosensitive oscillator 3 over the duration of count signal $\Phi_c$ (generated by a sampling operation of AND gate 4), and outputs a temperature pulse count or temperature information signal $D_t$.

Due to the nature of thermosensor 101, it takes a finite time for temperature pulse count $D_t$ to reach the actual temperature of the body when thermosensor 101 is placed in contact with the body, for example in the mouth. In addition, if thermosensor 101 moves relative to the body whose temperature is being measured, its output may vary, for example, if thermosensor 101 is removed from under the tongue. In order to inform the user that the thermometer is functioning correctly, the thermometer of the present invention analyzes the temperature signal derived from thermosensor 101 to determine whether the sensed temperature is rising or is constant and generates audible signals to inform the user of the same.

Reference numeral 7 denotes a data hold unit which stores a maximum value $D_m$ of the temperature pulse count $D_t$. Comparator 8 compares the maximum value $D_m$ of the temperature pulse count stored in the data hold unit 7 (i.e. the temperature at a first time) with a new temperature pulse count $D_t$ (the temperature at a second, later time) to output a coincidence signal $\Phi_a$.

There are three modes for the generation of coincidence signal $\Phi_a$. The first mode (A) is when the new temperature pulse count $D_t$ is greater than $D_m$. The second mode (B) is when $D_t$ is equal to $D_m$. The third mode (C) is when $D_t$ is less than $D_m$.

(A) $D_t > D_m$: Comparator 8 generates coincidence signal $\Phi_{a1}$ (shown as $\Phi_{a1-1}$; $\Phi_{a1-2}$ in FIG. 3(F)) when $D_t > D_m$. As shown in FIG. 3(F), $\Phi_{a1}$ is generated momentarily and then vanishes. However, $\Phi_a$ is stored as $\Phi_{am}$ in storage unit 10 of temperature rise detection device 21 (described in greater detail below). The presence of $\Phi_{am}$ allows latch signal $\Phi_1$ to pass through AND gate 9, the output of which is supplied to acoustic generator 16. Thus acoustic generator 16 generates a temperature rise signal $\Phi_{b1}$, which causes buzzer 103 to generate an audible signal indicating a temperature rise. The data in data hold circuit 7 are caused to be rewritten by latch signal $\Phi_1$, which passes through AND gate 9 due to the presence of $\Phi_{am}$.

Figure 3:
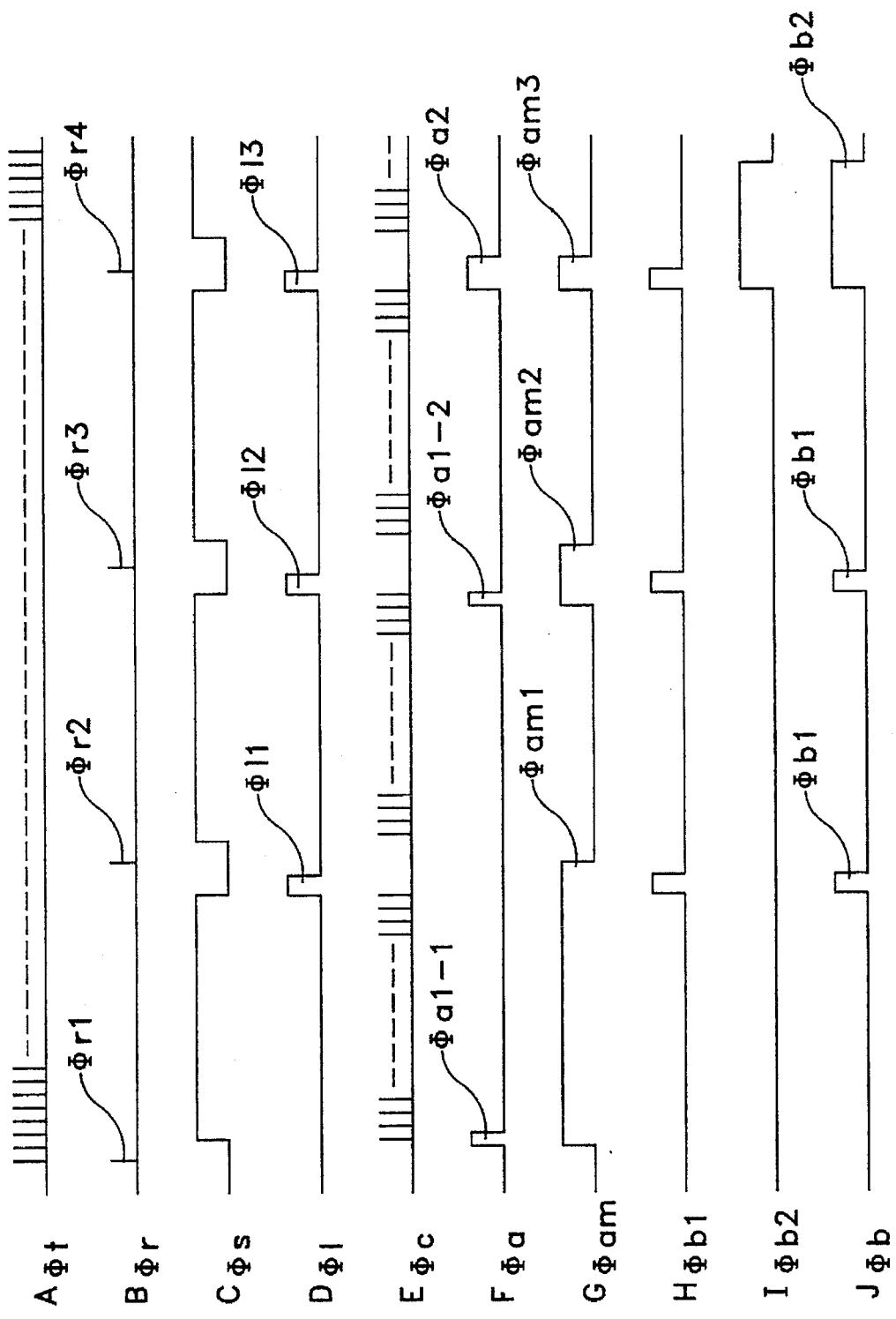
FIGS. 3(A–J) illustrate waveforms produced by corresponding essential elements of the thermometer of FIG. 2.

(B) $D_f = D_m$: When $\Phi_s$ falls, (i.e. temperature sampling ends), if $D_f = D_m$, comparator 8 generates signal $\Phi_{a2}$ (See FIG. 3(F)). $\Phi_{a2}$ is present at AND gate 14 until reset signal $\Phi_r$ is generated by control signal generator 2. Therefore latch signal $\Phi_1$ is allowed to pass through AND gate 14 and to turn on acoustic generator 15 ($\Phi_{a1}$ has disappeared as shown in FIG. 3 F). Acoustic generator 14 thus produces temperature stability signal $\Phi_{b2}$, which causes buzzer 103 to generate an audible signal indicating temperature stability. The data in data hold circuit 7 are rewritten by latch signal $\Phi_1$, which passes through AND gate 9 due to the presence of $\Phi_{am}$.

(C) $D_f < D_m$: No coincidence signal is generated when $D_f < D_m$. Therefore neither of AND gates 9 and 14 opens and buzzer 103 is not turned on. The next temperature measurement is then started (when $\Phi_s$ rises).

Temperature counter 6, data hold unit 7, comparator 8, AND gate 9 and storage unit 10 constitute a maximum temperature information hold device 20 which holds the maximum value of the measured temperature at all times after the temperature measurement starts. The AND gate 9 and storage unit 10 constitute a temperature rise detection device 21.

Reference numeral 11 denotes a decoder which converts the maximum value $D_m$ of the temperature information signal from the data hold unit 7 to a display pattern. Numeral 12 denotes a display driver and 102 a liquid crystal digital display.

Figure 4:
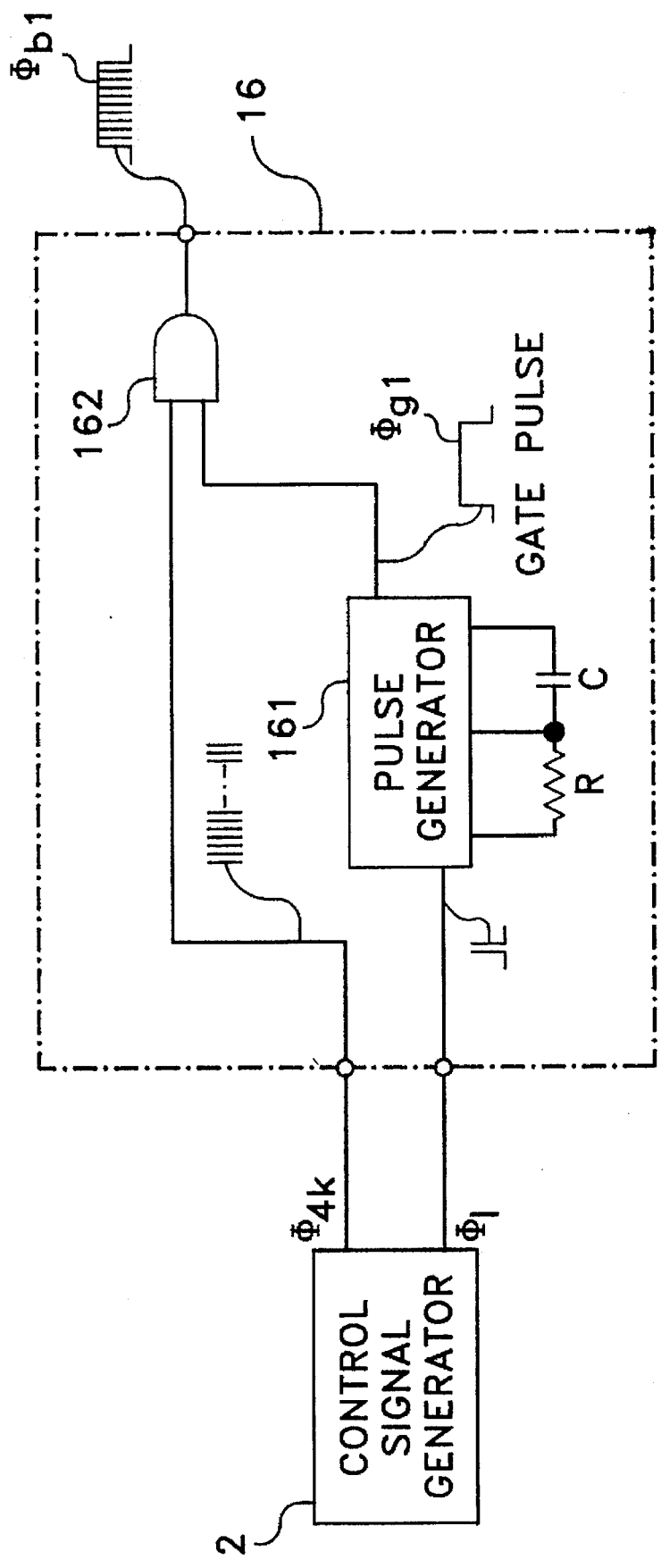
FIG. 4 is a block diagram of one of the acoustic generators shown in FIG. 2.

Acoustic generators 15 and 16 will now be described, referring to FIGS. 2, 3 and 4. Acoustic generator 15 generates a pulse train $\Phi_{b2}$ of approximately 1 second (see FIG. 3(I)) to cause buzzer 103 to produce an audible stability signal made up of a series of short beeps. Acoustic generator 16 produces a shorter pulse train $\Phi_{b1}$ of approximately 0.1 seconds (see FIG. 3(H)) to cause buzzer 13 to produce a single short audible temperature increase signal. For the sake of simplicity, only acoustic generator 16 will be described with the understanding that the two generators are substantially identical, except for the length of the pulse trains they generate.

When latch signal $\Phi_1$ is presented to acoustic generator 16 (due to the presence of coincidence signal $\Phi_{a1}$), pulse generator 161 within acoustic generator 16 produces a gate pulse $\Phi_{g1}$ having a duration of approximately 1 second. This gate pulse is fed into AND gate 162. Carrier signal $\Phi_{4k}$ (produced by control signal generator 2 and having a frequency of 4 kHz) is also fed into AND gate 162 and is modulated by gate pulse $\Phi_{g1}$ so that acoustic generator 16 produces temperature stability signal $\Phi_{b1}$ in the form of a train of pulses at the frequency of carrier signal $\Phi_{4k}$ and lasting 0.1 sec., the length of gate pulse $\Phi_{g1}$. This stability signal causes buzzer 13 to produce an audible stability signal having a relatively short duration (0.1 sec.) to indicate that the temperature measurement is progressing normally.

In the case of acoustic generator 15, gate pulse $\Phi_{g2}$ has a duration of 1 second, so $\Phi_{b2}$ having a duration of 1 second is output when the presence of $\Phi_{a2}$ at AND gate 14 allows latch signal $\Phi_1$ to pass through to acoustic generator 15. $\Phi_{b2}$ thus causes buzzer 13 to produce a relatively long audible signal made up of a series of short beeps to indicate that the temperature measurement has reached stability. The duration of gate pulses $\Phi_{g1}$, and $\Phi_{g2}$ is determined by the appropriate selection of the resistance of resistor R and the capacitance of capacitor C.

Referring again to FIG. 2, numeral 17 denotes an OR gate, 18 denotes a buzzer driver and 103 denotes the buzzer. The OR gate 17 receives temperature rise signal $\Phi_{b1}$ and a stability signal $\Phi_{b2}$ to output an information signal $\Phi_b$ shown in FIG. 3(J). The length of signal $\Phi_b$ output by OR gate 17 depends on whether $\Phi_{b1}$, or $\Phi_{b2}$ was presented at OR gate 17, that is, whether the temperature sensed by thermosensor 101 is rising or stable. Buzzer driver 18 receives the information signal $\Phi_b$ and, through buzzer 103, generates a different audible signal, depending on whether the sensed temperature is rising or is stable.

Figure 6:
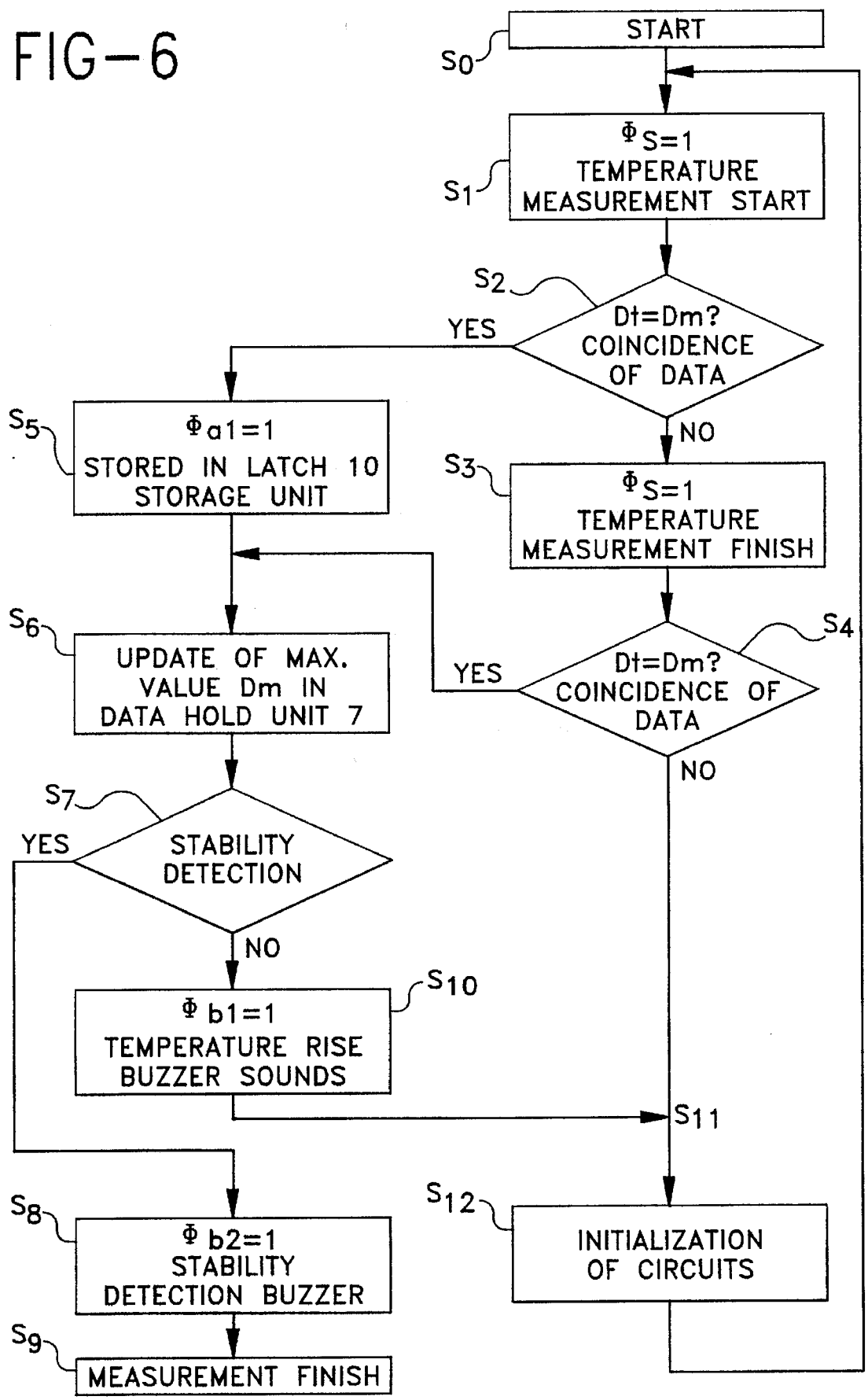
FIG. 6 is a flow chart illustrating the method of the present invention.

The method of operation of the invention will now be described with additional reference to FIG. 6. Numerals preceded by an "S" refer to the steps in the flow chart of FIG. 6.

In operation, when temperature measurement starts ($S_1$), reference oscillator 1 and thermosensitive oscillator 3 start to oscillate to generate a reference signal $\Phi_0$ and a thermosensitive signal $\Phi_t$ respectively. Control signal generator 2 receives reference signal $\Phi_0$ to generate the initial reset signal $\Phi_{r1}$ as shown in FIG. 3(B), to thereby reset and put the temperature counter 6 and storage unit 10 in an initialized measurement standby state.

As shown in FIGS. 3(C) and (E), a sampling signal $\Phi_s$ opens the AND gate 4 such that a count signal $\Phi_c$ is fed to the temperature counter 6, which counts the count signal $\Phi_c$ and outputs an initial temperature information signal $D_f$. Comparator 8 compares the initial temperature information signal $D_f$ and the information $D_m$ stored in the data hold unit 7 at the timing of a latch signal $\Phi_{11}$ ($S_2$). Since the data hold unit 7 has not received information at the start of the temperature measurement, $D_m = 0$. Therefore, since $D_f > D_m$ and comparator 8 outputs a coincidence signal $\Phi_{a1}$ of short duration at $D_f = 0$. $\Phi_{a1}$ is stored as $\Phi_{am}$ in storage unit 10 ($S_5$) and AND gate 9 is thus opened. This allows $\Phi_1$ to pass through AND gate 9.

This latch signal $\Phi_1$ passes through the AND gate 9 to a latch terminal of the data hold unit 7 ($S_6$). Thus, the initial temperature information signal $D_f$ of the temperature counter 6 is written into the data hold unit 7 as $D_m$, at which time the initial temperature information signal $D_f$ is displayed in figures as the maximum value $D_m$ of the measured temperature through the decoder 11 and display driver 12 on the digital display 102. The latch signal $\Phi_{11}$ which has also passed through the AND gate 9 is delivered to the acoustic signal generator 16, which then outputs a temperature rise information signal $\Phi_{b1}$ to thereby cause the buzzer 103 to generate an audible temperature rise signal through the OR gate 17 ($S_7$) and buzzer driver 18 ($S_{10}$). A first sampling operation is then terminated ($S_{11}$).

Similarly, a second sampling operation starts at the timing of a signal $\Phi_{r2}$ shown in FIG. 3(B) and is terminated by a latch signal $\Phi_{12}$ of FIG. 3(D). Comparator 8 compares the initial maximum temperature information signal $D_m$ stored in the data hold unit 7 and the second temperature information signal $D_f$ produced by the temperature counter 6. If $D_f \geq D_m$, the old data in the data hold unit 7 are rewritten with the second temperature information signal $D_f$ as a new maximum value $D_m$ and displayed in figures on the display 102 and a temperature rise informing sound is generated from the buzzer 103.

When the result of the comparison by the comparator 8 is $D_t<D_m$, no coincidence detection signal $\Phi_a$ is output during the operation of the temperature counter 6, and the AND gate 9 is left closed. Thus, data in the data hold unit 7 are not rewritten and the previous temperature information signal continues to be output as the maximum value $D_m$. Similarly, the maximum temperature information hold device 20 continues to output the maximum value $D_m$ of the measured temperature information each time the sampling operation is performed after the temperature measurement starts.

Thus, as the measured temperature increases, the output of maximum temperature hold device 20 gradually raises the temperature displayed on display 102 until the displayed temperature coincides with the user's body temperature to be stabilized. At this time ($S_3$), $D_f=D_m$, and sampling signal $\Phi_s$ has fallen so that a coincidence signal $\Phi_{a2}$ is output by comparator 8 ($S_4$) to open the AND gate 14 and thereby allow the latch signal $\Phi_1$ to pass through AND gate 14 ($S_7$). The latch signal $\Phi_1$ is fed to the acoustic signal generator 15, which then outputs a stability signal $\Phi_{b2}$ to cause the buzzer 103 to generate an audible stability signal through the buzzer driver 18 ($S_8$).

Since the temperature rise signal is a single tone of short duration, the user is able to confirm by the audible signal that the measurement is being made correctly from the time when the thermometer is set in position in contact with the user's body. The user is also informed of the end of the measurement by the audible stability signal made up of a series of tones of short duration.

Figure 5:
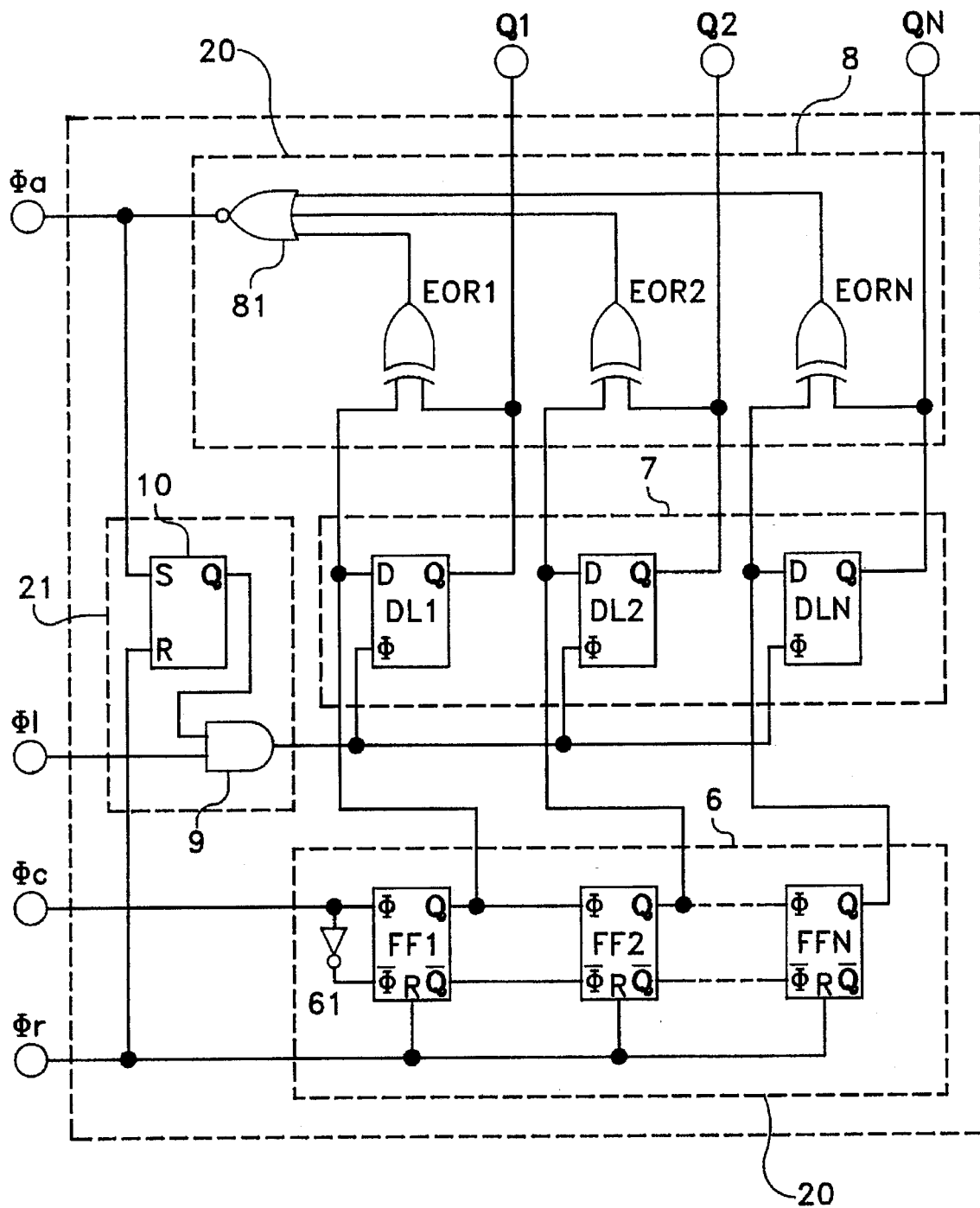
FIG. 5 is a circuit diagram of a maximum temperature information hold device shown in FIG. 1.

FIG. 5 is a circuit diagram of the maximum temperature information hold device 20 of FIG. 2. Temperature counter 6 is a well-known binary counter composed of N cascaded flip-flops (hereinafter referred to as FFs) 1–N. FF 1 receives count signals $\Phi_c$, $\Phi_c$ at its input terminals $\Phi$, $\Phi$. FFs 1–N each receive a reset signal $\Phi_r$ at its reset terminal R. Data hold unit 7 is a well-known latch composed of N flip-flops (hereinafter referred to as DLs) 1–N which are the same as those of the temperature counter 6. In the preferred embodiment, temperature counter 6 is a four digit counter, each digit being a decade counter, and counts binary pulses in $\Phi_c$. The counter for each digit is therefore a binary coded decimal circuit comprising four flip-flops. Thus, N is equal to 16, although for simplicity, only three FFs and DLs are shown. Also, data hold unit 7 and comparator 8 need to store or compare data for all four digits of counter 6 (the outputs of all FFs).

Data input terminals D are connected to the respective output terminals Q of the FFs of the temperature counter 6 with a clock terminal $\Phi$ of each DL being connected to the output terminal of the AND gate 9. Output terminals $Q_1$–$Q_N$ of the DLs are maximum temperature information output terminals which are connected to the inputs of the decoder 11.

Comparator 8 is composed of N Exclusive-OR gates (hereinafter referred to as EORs) 1–N which are the same in number as the FFs of each of temperature counter 6 and data hold unit 7, and NOR gate 81 with N input terminals. The EORs are connected at one input terminal to the corresponding output terminals Q of the FFs of the temperature counter 6 and to the output terminals Q of the corresponding DLs of the data hold unit 7 at the other input terminal. The output terminals of EORs 1–N are connected to the corresponding first-$N^{TH}$ input terminals of NOR gate 81, the output terminal of comparator 8 which outputs a coincidence signal $\Phi_a$ to a set terminal S of RS FF 10 which constitutes the temperature rise detection device 21. In this arrangement, EORs 1–N and NOR gate 81 constitute a coincidence detector which detects the coincidence of the output data in the temperature counter 6 and in the data hold unit 7. RS FF 10 constitutes a storage unit which stores a coincidence signal from the comparator 8 while RS FF 10 and AND gate 9 constitute temperature rise detection device 21.

The operation of the maximum temperature information hold device 20 according to the present invention will be described next. First, as shown in FIG. 3(B), the control signal generator 2 generates a first reset signal $\Phi_{r1}$ to initialize the temperature counter 6 and the temperature rise detection device 21 putting the temperature counter in a measurement standby state. In the sampling state of FIG. 3(C), the temperature counter 6 starts to count up count signals $\Phi_c$ of FIG. 3(E). The coincidence detector composed of EORs 1–N and NOR gate 81 normally compares the count ($D_t$, which changes with time) with the maximum value $D_m$ of the temperature information stored in data hold unit 7. When the count $D_t$ of temperature counter 6 and the storage information $D_m$ of data hold unit 7 coincide instantaneously in the counting operation, NOR gate 81 generates a coincidence signal $\Phi_a$, of short duration which is then and written into RS FF 10. Temperature counter 6 further counts up so that $D_t$ no longer equals $D_m$. However, the information on the coincidence which has been generated in the counting operation is stored as a coincidence storage signal $\Phi_{am}$ in RS FF 10. As shown in FIG. 3(D), a latch signal $\Phi_{11}$ is generated simultaneously with the termination of the counting operation of temperature counter 6. $\Phi_{11}$ passes through AND gate 9 which is in an open state due to coincidence signal $\Phi_{am}$ from RS FF 10. The previous data ($D_m$) in data hold unit 7 is overwritten with the latest temperature information $D_t$ as a new maximum temperature information value $D_m$. When temperature counter 6 ends its counting operation without the coincidence signal $\Phi_a$ being obtained, no coincidence signal $\Phi_{am}$ is stored in RS-FF 10. Thus, AND gate 9 remains closed. Therefore, no data is rewritten by latch signal $\Phi_1$ and the previous maximum temperature information $D_m$ stored in data hold unit 7 remains unchanged. Acquisition of the coincidence signal $\Phi_a$ in the above operation means that the last count in the temperature counter 6 is larger than the information stored in the data hold unit 7. Acquisition of no coincidence signal $\Phi_a$ means that the last count in the temperature counter 6 is smaller than the information stored in data hold unit 7. Acquisition of the coincidence signal $\Phi_a$ when the counting operation of the temperature counter 6 ends (i.e., $\Phi_s$ has fallen) means that the count in the temperature counter 6 at the termination of the counting operation is equal to the information stored in the data hold unit 7, which means that a stable temperature measurement state has been attained where the temperature of the thermometer is coincident with the user's body temperature. At that time the coincidence signal $\Phi_a$ becomes a stability detection signal.

As described above, according to the present invention, a temperature rise detection device is provided to audibly inform that the measured temperature is rising. Thus, the user is able to know that the temperature measurement is being correctly made with the electronic thermometer being set in position on the user's body at the point where the user's body temperature is measured. Since different acoustic signals are used to inform the user of a rise in the temperature and a stable temperature, further progress and termination of the temperature measurement is easily recognized. According to the present invention, the larger of the counted data ($D_t$) and the stored data ($D_m$) is determined by the presence or absence of an instantaneous coincidence with the counted data and the stored data. The circuit configuration of the comparator is thus greatly simplified to thereby miniaturize its IC chip. Which of the counted data and the stored data is larger than the other is determined during the counting operation of the temperature counter, the displayed temperature is switchable simultaneously with the termination of the counting operation to greatly contribute to the miniaturization of the electronic thermometer and an increase in the speed of the temperature measurement.

We claim:

1. An electronic thermometer comprising:

a thermosensitive oscillator for producing an output signal, the oscillating frequency of which changes depending on a change in a measured temperature;

a reference oscillator for generating a reference signal;

a temperature counter for measuring the output signal from said thermosensitive oscillator on the basis of the reference signal and for producing a temperature count;

a data hold unit for holding a maximum value of the signal measured by said temperature counter;

a comparator for comparing data in said data hold unit with new measured data in said temperature counter and to rewrite the data in said data hold unit with the new measured data in accordance with the result of the comparison by said comparator;

temperature rise detection means for detecting that the measured temperature is rising in accordance with the result of the comparison by said comparator and for producing a temperature rise detection signal; and sound generating means provided such that the temperature rise detection signal from said temperature rise detection means drives said sound generating means to indicate that the measured temperature is rising.

2. An electronic thermometer according to claim 1, wherein said comparator comprises a coincidence detector for detecting a coincidence between the temperature count produced by said temperature counter and the data stored in said data hold unit, and said temperature rise detection means comprises a storage for storing a coincidence signal indicative of the coincidence between the count in said temperature counter and the data stored in said data hold unit and detected by said coincidence detector whereby said temperature rise detection means generates a temperature rise detection signal in accordance with an output signal from said storage.

3. An electronic thermometer according to claim 2, comprising an acoustic drive signal generator responsive to the temperature rise detection signal for outputting a first acoustic drive signal having a predetermined duration.

4. An electronic thermometer according to claim 3, wherein said comparator detects a coincidence between the data stored in said data hold unit and the measured data present at the termination of the counting operation of said temperature counter to output a stability detection signal.

5. An electronic thermometer according to claim 4, further comprising an acoustic drive signal generator responsive to the stability detection signal for outputting a second acoustic signal having a predetermined duration.

6. An electronic thermometer according to claim 5, wherein the first acoustic signal is different in duration than the second acoustic signal.

7. An electronic thermometer according to claim 1, further comprising a display for displaying, as a temperature, the maximum value of the temperature count in said data hold unit.

* * * * *